Patented Apr. 5, 1938

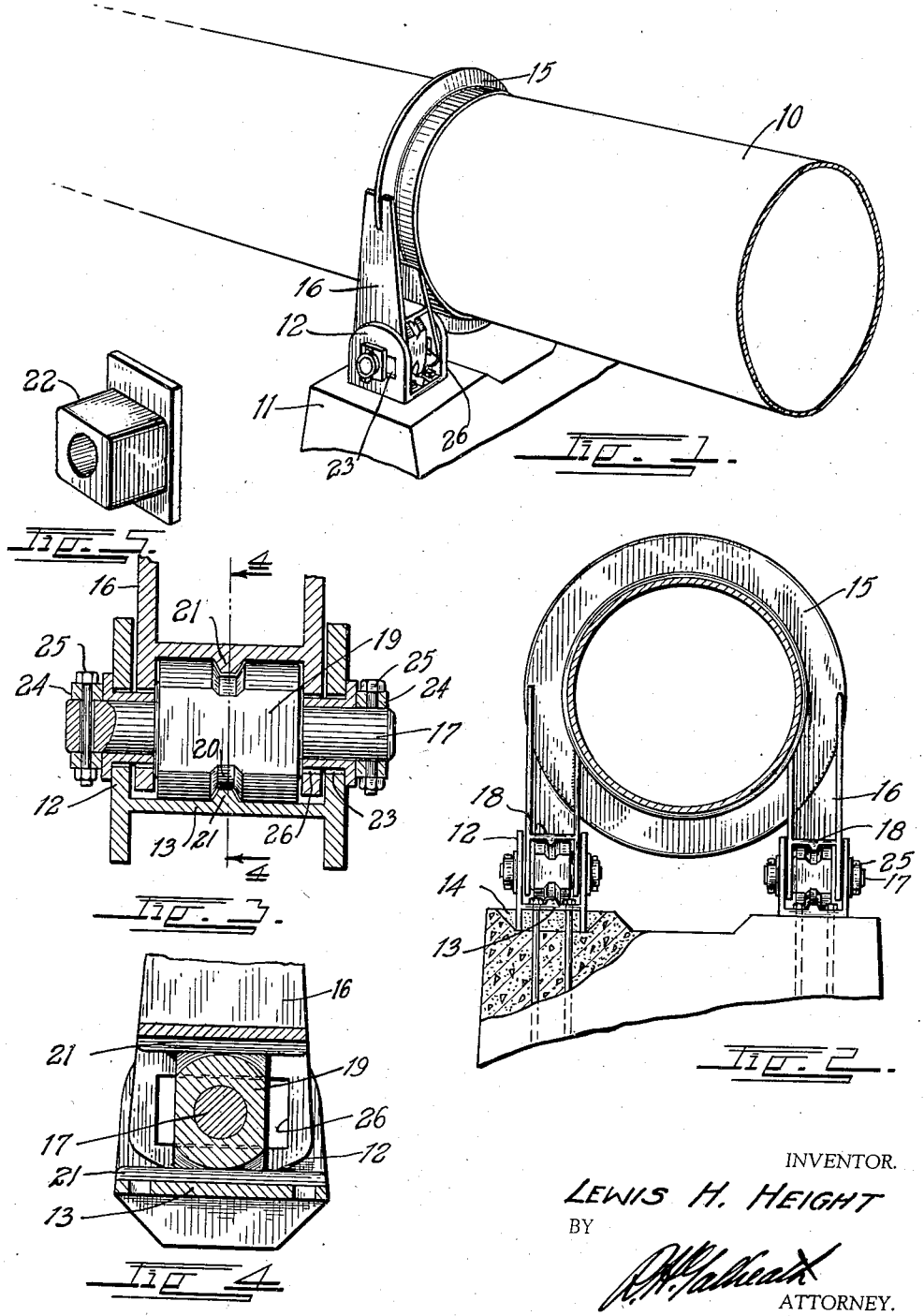

2,113,083

UNITED STATES PATENT OFFICE 2,113,083

PIPE-LINE SUPPORT

Lewis H. Height, Denver, Colo., assignor to Thompson Manufacturing Co., Denver, Colo.

Application February 11, 1936, Serial No. 63,315

5 Claims. (Cl. 248—49)

This invention relates to a support for relatively large pipe lines. It is essential in long metallic conduits that provision be made to allow the conduit to expand longitudinally, due to the temperature changes therein. This expansion has usually been accommodated by mounting the conduit on suitable rollers. Such a mounting, however, is not altogether satisfactory in conduits of great length which are subjected to extreme variations in temperature. Often the sun will heat one side of a conduit while the other side remains cool. This uneven heating causes uneven expansion and tends to twist or bend the pipe often lifting the rollers from their seats or pushing them to one side of the seats.

The principal object of this invention is to provide an expansion support for pipe lines which will resist twisting, bending, and lifting strains and yet will effectively accommodate longitudinal expansions.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view illustrating one of the improved supports in place upon a pipe line.

Fig. 2 illustrates a cross section through the pipe of Fig. 1, looking toward the improved support.

Fig. 3 is a detailed enlarged section illustrating the roller bearings employed in the support.

Fig. 4 is a lateral section through the roller bearing, taken on the line 4—4, Fig. 3.

Fig. 5 is a detail view of the bearing bushing employed in this device.

In Fig. 1, a typical sheet metal pipe of the type used for conveying water, gas or oil for long distances above ground is indicated at 10. A concrete pedestal for supporting the pipe 10 is indicated at 11.

In applying the invention, the pipe 10 is provided at spaced-intervals with rings or collars 15. These rings or collars may be formed of T-irons, I-beams, or angle irons welded or otherwise secured to the pipe. It is preferred to form the collar of T-iron.

At each side of each collar, a downwardly depending leg member is formed. The leg member consists of two vertical side plates 16 joined above their lower extremities by means of a horizontal roller plate 18. The lower extremities of the side plates 16 of each leg extend between a pair of side plates 12 of a receiving shoe. The shoe consists of the side plates 12 and a bed plate 13. The bed plate 13 connects the side plates 12 above the lower extremities of the latter so as to allow said lower extremities to project below the bed plate 13.

A roller 19 is positioned between the roller plate 18 and the bed plate 13 to transmit the weight of the pipe to the bed plates 13. Each of the rollers 19 is formed with an axle shaft 17 which projects outwardly from both extremities of the roller. The side plates 16 of the leg are horizontally slotted, as shown at 26, and the side plates 12 are similarly slotted, as shown at 23, for the passage of the extremities of the shaft 17.

A square bushing surrounds each projecting extremity of the shaft 17, where the latter passes through the side plates. The width of this bushing 22 is such as to prevent it from rotating in the slots 23 and 26. The bushings are maintained in place upon the shaft by means of set collars 24 which are in turn locked in place by suitable pins or bolts 25.

When the pipe line is being erected, the pipe 10 is supported upon temporary blocks at the proper grade level, with the side plates 12 of the shoes depending into temporary depressions in the top of the pedestals 11. These depressions are then filled with a rich concrete mixture as shown at 14, in Fig. 2. After the concrete has set, the temporary blocking can be removed. Suitable anchor bolts may then be tightened to hold the bed plates 13 in place, as shown in Fig. 2.

It can be readily seen that any longitudinal expansion or contraction of the pipe 10 is absorbed by the rollers 19 rolling between the plates 13 and 18. It can also be seen that should the pipe tend to twist, due to uneven expansion or contraction, such twisting will be prevented by the vertical lock construction provided by the shaft 17 with its bushings 22 passing through the horizontal slotted openings in the plates 12 and 16.

Thus, any tendency of the side plates 16 of the leg to lift is prevented by the bushings 22. It is desired to call attention to the fact that this upward movement is absorbed by the bushings and does not result in a clamping or cramping of the axle shaft 17.

Any tendency of the pipe to bend or shift in a horizontal plane is also prevented by the coaction of the plates 16 and 12. The latter plates prevent any lateral movement of the former. To assist the side plates from absorbing sideward strains, the roller plates 18 and the bed plates 13 may be formed with ridge-like tracks 21, the roller 19 formed with receiving grooves 20 which ride over the tracks 21. This still further strengthens the assembly against sideward movements.

Since the rollers 19 need never make a complete revolution, in fact can not, due to the length of the slots 23 and 26, it is not necessary that they be completely cylindrical. Considerable weight can be saved by having the unused sides flattened, as illustrated.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A pipe support comprising: an annular collar secured to said pipe; legs extending downwardly from opposite sides of said collar; a shoe for receiving the lower extremity of each leg; a roller interposed between each leg and its shoe; a shaft extending from each roller; means on said shoe for engaging said shaft to prevent said roller from lifting from said shoe; and means on said leg for engaging said shaft to prevent said legs from moving away from said rollers.

2. A pipe support comprising: an annular collar secured to said pipe; legs extending downwardly from opposite sides of said collar; a shoe for receiving the lower extremity of each leg; a roller interposed between each leg and its shoe; a shaft extending from each roller; means on said shoe for engaging said shaft to prevent said roller from lifting from said shoe, said means allowing longitudinal movement of said shaft relative to said shoe.

3. Means for supporting a pipe line comprising: an annular collar adapted to be secured about said pipe line; a pair of vertical side plates extending downward from each side of said collar; a horizontal roller plate secured between each pair of side plates above the lower extremities of the latter; a stationary bed plate positioned below said roller plate; a fixed side plate extending upwardly from said bed plate adjacent each of said first side plates; a roller positioned between and supporting said roller plate from said bed plate, all of said vertical plates being slotted; and a horizontally disposed shaft extending through said roller and the slots in said vertical plates.

4. Means for supporting a pipe line comprising: an annular collar adapted to be secured about said pipe line; a pair of vertical side plates extending downward from each side of said collar; a horizontal roller plate secured between each pair of side plates above the lower extremities of the latter; a stationary bed plate positioned below said roller plate; a fixed side plate extending upwardly from said bed plate adjacent each of said first side plates; a roller positioned between and supporting said roller plate from said bed plate, all of said vertical plates being slotted; a horizontally disposed shaft extending through said roller and a bushing on each extremity of said shaft, said shaft and bushings extending through the slots in said vertical plates.

5. Means for supporting a pipe line comprising: an annular collar adapted to be secured about said pipe line; a pair of vertical side plates extending downward from each side of said collar; a horizontal roller plate secured between each pair of side plates above the lower extremities of the latter; a stationary bed plate positioned below said roller plate; a fixed side plate extending upwardly from said bed plate adjacent each of said first side plates; a roller positioned between and supporting said roller plate from said bed plate, all of said vertical plates being slotted; a horizontally disposed shaft extending through said roller and a square bushing on each extremity of said shaft, said shaft and bushings extending through the slots in said vertical plates.

LEWIS H. HEIGHT.